July 17, 1928.
C. F. JENKINS
1,677,590
PRISM LENS UNIT
Filed July 1, 1925
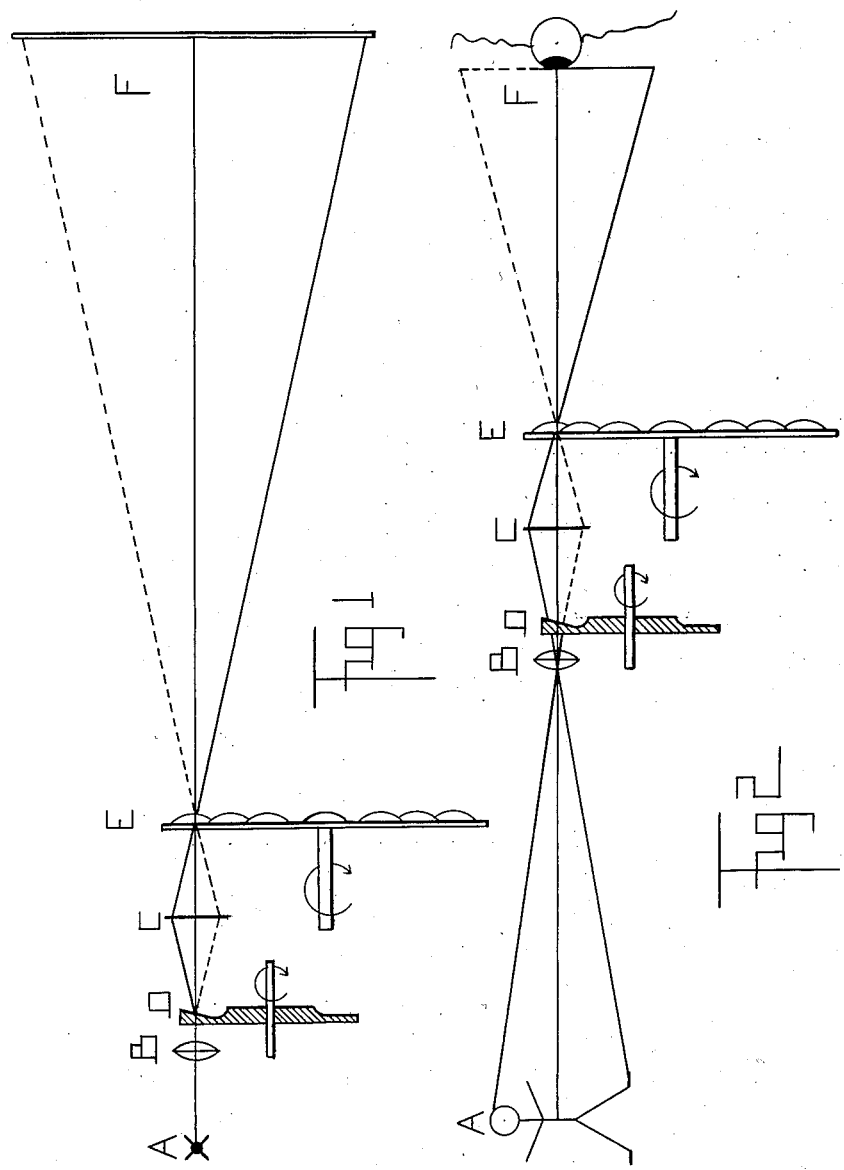
Inventor
C. Francis Jenkins Patented July 17, 1928.

1,677,590

UNITED STATES PATENT OFFICE.

CHARLES FRANCIS JENKINS, OF WASHINGTON, DISTRICT OF COLUMBIA.

PRISM-LENS UNIT.

Application filed July 1, 1925. Serial No. 40,839.

This invention relates to apparatus for use in radio vision and in the transmission of motion pictures by radio, and has for its principal object a more flexibly adjustable mechanism than heretofore employed.

In mechanisms previously used for the vertical and transverse scanning of a flat picture plane, real or imaginary (aerial), the devices which gave movement in both directions operated on the same plane, that is, both the horizontal and vertical traverses sweep across a single image plane of the lens, the opposite focus of which is on the picture-object. This involved certain annoying limitations which are avoided by the method of getting movement in one direction in one focal plane and the transverse movement in another focal plane, as hereinafter disclosed, illustrated in the drawings, and particularly pointed out in the claim.

In the drawings Fig. 1 is a diagrammatic illustration of the scheme as employed in a receiving machine, and Fig. 2 the same employed in a sending machine.

In both figures like symbols refer to like parts, in which A is a light source; B a lens for imaging the light source onto a screen C, through a prismatic ring D (Patent No. 1,385,325). E is a lens disc having equi-spaced, circularly arranged lenses thereon, each of which comes into action in succession to sweep the light source transversely in the plane F, which may be a white screen.

In Fig. 2 the lighted figure A is the light source, and for the white screen in the focal plane F a light-sensitive cell is substituted, the method of operation being the same in both cases, i. e., both sending and receiving.

Referring to Fig. 1, a receiving device, as perhaps the easier to illustrate the method, let it be assumed that the light source A is sharply imaged or focused on the screen C as a spot. But as the light passes through the top of the prismatic ring D the ray is deflected from its axial line and the spot appears at the top of the screen C. But when the prismatic ring is rotated the constantly changing angle of the prism causes the light spot to travel downward in a straight line on the screen until it reaches its lowest point of travel.

That is, the rotation of the prismatic ring sweeps the image of the light source in a vertical line, say, from top to bottom of the screen C. If the spot so travels every one-sixteenth of a second, then persistence of vision deceives the eye into the belief that it is a complete, lighted line, whereas the eye only sees an approximately round spot of light in an infinite succession of imaginary positions in a straight line from top to bottom of screen C; and the middle lens on lens disc E at rest would image this line as a vertical line on the screen F.

If, however, the lens disc E is in rotation, then the lenses on lens disc E will cause the image-spot of light to sweep transversely across the screen F as many times as there are lenses passing during the time of one rotation of prism D, two hundred, for example, and the whole surface of the screen F will seem to be lighted, for the vertically moving spot on screen C is simultaneously given two hundred transverse movements in the plane F, the common focal plane of all the disc-mounted lenses.

To further illustrate, it may be pointed out that when the spot is at the top of screen C it is swept transversely across the bottom of screen F; when it is at the bottom of its travel on screen C, then it is swept across the top of screen F; and one hundred and ninety-eight other times across screen F at successive levels between the first and last line. And, as noted above, if this all happens every sixteenth of a second the screen F seems to be lighted over its whole surface.

As the means for varying the strength of the light by radio in a definite order to build up a picture on the screen F is no part of this invention, it is not here illustrated.

It can well be understood that where line speeds, of the low order assumed above, occur at the rate of 192,000 per minute, usual radio picture mechanism methods are not adequate, and, therefore, any method which increases the permissible latitude in operation or mechanism is highly desirable.

What I claim, is—

In apparatus of the class described, a fixed source of light, a screen, a lens for concentrating a point of light from the light source in a focal plane, means for scanning the screen with the said point of light as a spot on the screen comprising a prismatic ring located in the optical axis of the lens, a rotatable carrier having a plurality of lenses, each of which in succession moves across the optical axis of said first lens, and means for rotating said prismatic ring and lens carrier in synchronism.

In testimony whereof I have affixed my signature.

CHARLES FRANCIS JENKINS.